United States Patent
Doerner

(10) Patent No.: US 10,466,472 B2
(45) Date of Patent: Nov. 5, 2019

(54) OPTICAL ARRANGEMENT FOR DEFLECTING A LASER BEAM

(71) Applicant: TRUMPF LASER GMBH, Schramberg (DE)

(72) Inventor: Jochen Doerner, Schiltach (DE)

(73) Assignee: TRUMPF LASER GMBH, Schramberg (DE)

( * ) Notice: Subject to any disclaimer, the term of this patent is extended or adjusted under 35 U.S.C. 154(b) by 835 days.

(21) Appl. No.: 14/685,826

(22) Filed: Apr. 14, 2015

(65) Prior Publication Data

US 2015/0219891 A1  Aug. 6, 2015

Related U.S. Application Data

(63) Continuation of application No. PCT/EP2013/070848, filed on Oct. 7, 2013.

(30) Foreign Application Priority Data

Oct. 15, 2012 (DE) .................. 10 2012 218 769

(51) Int. Cl.
*G02B 26/08* (2006.01)
*G02B 7/00* (2006.01)
*G02B 7/182* (2006.01)
*G02B 7/18* (2006.01)

(52) U.S. Cl.
CPC ......... *G02B 26/0883* (2013.01); *G02B 7/008* (2013.01); *G02B 7/181* (2013.01); *G02B 7/182* (2013.01); *G02B 26/0816* (2013.01); *G02B 7/1827* (2013.01); *G02B 26/0891* (2013.01)

(58) Field of Classification Search
None
See application file for complete search history.

(56) References Cited

U.S. PATENT DOCUMENTS

| 2,625,359 A | 1/1953 | Eagle |
| 6,046,840 A * | 4/2000 | Huibers ............ G02B 26/0833 359/224.1 |
| 7,729,065 B2 | 6/2010 | Schoeppach |
| 2005/0073757 A1 | 4/2005 | Turner et al. |
| 2010/0316437 A1 | 12/2010 | Newswander |
| 2012/0038964 A1 * | 2/2012 | De Wind .................. B60R 1/04 359/265 |

(Continued)

FOREIGN PATENT DOCUMENTS

| AU | 2003218230 A1 | 10/2003 |
| CN | 201166723 Y | 12/2008 |

(Continued)

OTHER PUBLICATIONS

International Search Report from corresponding PCT Application No. PCT/EP2013/070848, dated Nov. 28, 2013, 4 pages.

(Continued)

*Primary Examiner* — Darryl J Collins
*Assistant Examiner* — Journey F Sumlar
(74) *Attorney, Agent, or Firm* — Fish & Richardson P.C.

(57) ABSTRACT

An optical arrangement includes an optics holder and a reflective optic fixed to the optics holder, in which the optics holder includes at least two holding members for fixing the reflective optic to the optics holder, and in which at least one of the holding members is resiliently deflectable.

10 Claims, 2 Drawing Sheets

(56) References Cited

U.S. PATENT DOCUMENTS

2012/0300183 A1\* 11/2012 Schaffer ................. G02B 7/182
  355/66
2013/0314813 A1\* 11/2013 Vidal ..................... G02B 7/183
  359/853

FOREIGN PATENT DOCUMENTS

| CN | 102508347 A | 6/2012 |
| CN | 102565980 A | 7/2012 |
| DE | 2542233 A1 | 1/1976 |
| DE | 3119299 A1 | 11/1982 |
| DE | 3328349 A1 | 2/1985 |
| DE | 102006038787 A1 | 2/2008 |
| EP | 1308765 A1 | 11/2002 |
| GB | 1519185 | 7/1978 |
| JP | 2009508344 A | 2/2009 |
| WO | WO2008019753 A1 | 2/2008 |

OTHER PUBLICATIONS

Notification of Transmittal of Translation of the International Preliminary Report on Patentability and Written Opinion of the International Searching Authority for corresponding PCT Application No. PCT/EP2013/070848, dated Apr. 20, 2015, 8 pages.

\* cited by examiner

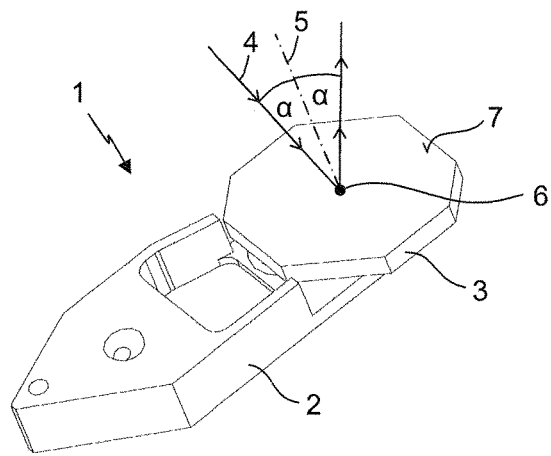
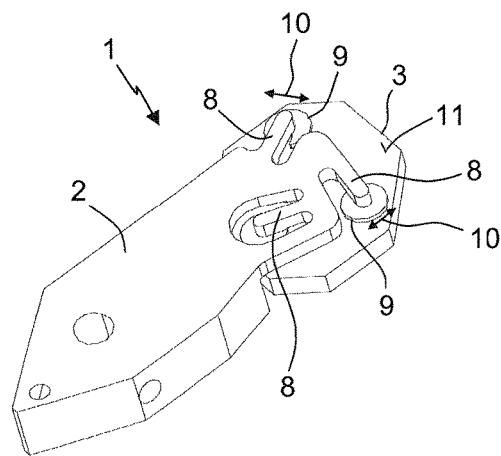
Fig. 1          Fig. 2
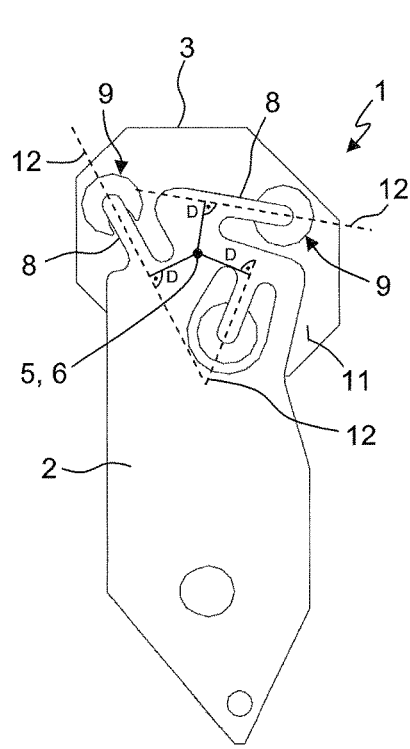
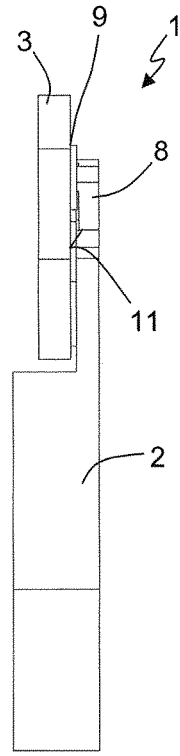
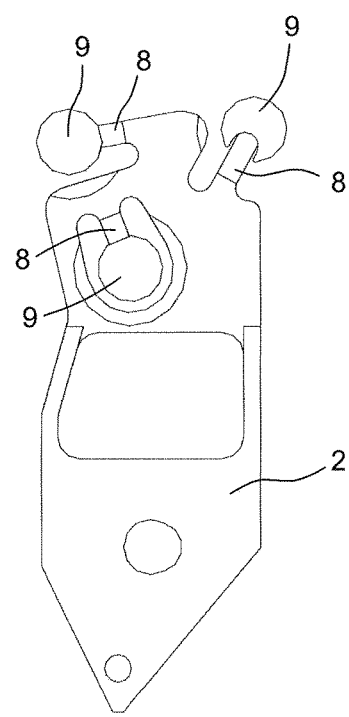
Fig. 3          Fig. 4          Fig. 5

OPTICAL ARRANGEMENT FOR DEFLECTING A LASER BEAM

CROSS-REFERENCE TO RELATED APPLICATIONS

This application is a continuation of and claims priority under 35 U.S.C. § 120 to PCT Application No. PCT/EP2013/070848 filed on Oct. 7, 2013, which claimed priority to German Application No. DE 10 2012 218 769.3, filed on Oct. 15, 2012. The contents of both of these priority applications are hereby incorporated by reference in their entirety.

TECHNICAL FIELD

The present disclosure relates to an optical arrangement for deflecting a laser beam.

BACKGROUND

In known optical arrangements, a reflective optic for deflecting a laser beam (for example, a mirror) is typically connected to an optics holder (e.g., a mirror holder) over an entire surface of one side of the reflective optic (for example, the rear side of a mirror). Alternatively, the reflective optic is fixed to the optics holder by portions of an edge side (for example, a peripheral side of a mirror) or portions of the front side.

SUMMARY

Connecting the reflective optic to the optics holder on one side over the entire surface can be associated with various problems. Heat can be introduced into the reflective optic (hereinafter called the optical center) due to the laser beam incident upon the reflective optic at a point of impingement. The heat that is introduced is delivered or dissipated to the optics holder through the point of connection. As a result, heat flow is established from the point of impingement of the laser beam, which can be regarded as a heat source, to the optics holder, which can be considered to be a heat sink. Both in an initial transient condition (for example, shortly after the laser has been switched on or shortly after the laser beam has struck the reflective optics) and in a steady-state condition (after the laser has been in operation for a relatively long time), a temperature gradient is established by heat conduction between the above-described heat source and the heat sink, so that the optical components (the reflective optics and the optics holder) expand differently locally according to their local temperatures and based on their thermal expansion coefficients, which are generally different.

This different geometric expansion has the result, on the one hand, that stresses arise in the components, which can lead to warping of the components. On the other hand, the geometric expansion or deformation of the components, in particular of the reflective optics, combined with single-sided full-surface fixing to the optics holder, leads to changes in the spatial position of the reflective optics through the temperature influences and can result in unintentional deflection of the laser beam from its desired position. For example, the above-described temperature influences can lead to curvature of the reflective optics and a translational displacement of the reflective optics. As a result, the point of impingement of the laser beam on the reflective optics and the corresponding axis of incidence may be changed with respect to the position and orientation in space. This is disadvantageous for operation of the laser because the laser beam may increasingly be deflected in an undesirable direction. Additionally, the different temperature-related expansion of the components is most pronounced at the point of connection of the two components, which leads to a particularly high mechanical load on the point of connection.

In order to counteract these problems, a particularly thick, resilient adhesive layer to connect the reflective optics to the optics holder can be used. Such a thick, resilient adhesive layer can compensate at least in part for the difference in expansion at the point of connection of the two components. However, this solution is unsuitable where high demands are made in terms of the precision of the optical members, because a thick adhesive layer reacts to changes in humidity and temperature. Furthermore, it may be that the adhesive layer does not have an exactly constant thickness throughout. The uneven thickness can lead to further unsymmetrical effects. Another disadvantage is the long curing time of thick adhesive layers. Furthermore, a thick adhesive layer can prevent the conduction of heat into the optics holder and accordingly lead to an undesirable build-up of heat in the reflective optics. A different measure for counteracting the temperature-related difference in expansion of the two components includes choosing titanium as the material for the optics holder, such that the difference in the thermal expansions is generally reduced. However, titanium as a material is relatively expensive to obtain and can be difficult to process. Further possible solutions provide a mechanically complex, mutually movable mounting of the reflective optics on the optics holder by mutually movable guides and spring members. However, this is disadvantageously accompanied by friction effects which cannot be determined exactly.

The subject matter of the present disclosure encompasses an optical arrangement with which undesirable mounting- and temperature-related deflection of the laser beam can be reduced or prevented.

In general, according to one aspect, the subject matter of the present disclosure covers an optical arrangement having an optics holder to which a reflective optic is fixed, in which the optics holder has at least two holding members for fixing the reflective optics, of which at least one is resiliently deflectable. As a result of the at least two holding members, a thinner adhesive layer can be provided than in known adhesive connections, and bearing forces and forces resulting from distortions can be transferred to the resilient holding member(s). With the at least one resilient holding member, a temperature-related expansion of the reflective optic can be compensated for, or equalized, in an advantageous manner by the optics holder. Because the holding members of the optics holder, which provide support or serve as bearings, are movable relative to one another due to the resilient deflection capability of the at least one holding member (which manifests itself, for example, as pivoting or twisting of the holding member), the at least one resiliently deflectable holding member is able to yield locally and thus follow a local expansion movement of the reflective optic. The reflective optic is accordingly able to expand (locally or globally) without the expansion movements causing an appreciable spatial displacement (for example, a translational or rotary movement) of the reflective optic. In particular, the point of impingement of the laser beam on the reflective optic advantageously remains spatially at the same position and does not change its spatial orientation despite a temperature-related expansion of the reflective optic, so that an unintentional deflection of the laser beam is avoided. A spatial change of the position or orientation of the point of impingement can be reduced by the optical arrangement so that a deflection of the laser beam is negligibly small for the laser operation of the optical arrangement. In some implementations, the expansion or distortion of the reflective optics advantageously does not lead to a displacement, curvature or rotation of the reflective optic according to the expansion, as is the case with a solely rigid fixing.

It is possible to benefit from the identified advantages during laser irradiation onto the reflective optics, but also before or after such irradiation in terms of time (provided, for example, that there is a temperature distribution in the reflective optics that is different from the expansion at room temperature). Because the optic is held at multiple points (two or more), the different thermal expansion of the material of the reflective optic, on the one hand (typically a glass material), and of the optics holder, on the other hand (generally a metal material), can be equalized. With the optical arrangement, a warp-neutral mounting of optical components is possible. The reflective optic can be in the form of a mirror, for example. The optical arrangement can be used, for example, in the resonator of a laser, in the beam path between the resonator and the processing head or transport fiber, or in the processing head of a laser machine. The applicability of the optical arrangement is not limited to laser radiation but can in principle also be used in connection with other electromagnetic radiation.

In some implementations, multiple resiliently deflectable holding members are provided, in which the members are in the form of holding arms having holding faces, where the reflective optic(s) is (are) fixed to the holding faces. In the case of multiple resiliently deflectable holding members or resiliently deflectable holding arms, the holding members or holding arms are deflectable individually and thus relative to one another, so that the corresponding holding faces are also able to move relative to one another. This advantageously assists a stress-free mounting and holding of the reflective optic in the event that locally different expansions occur in the reflective optic (e.g., as a result of an inhomogeneous temperature field in the reflective optic).

In some implementations, the longitudinal axes of the holding arms are arranged equidistantly with respect to an axis extending perpendicularly to the reflective optic. As a result, any temperature-related change in the length of the holding arms leads to primarily a rotary movement of the reflective optics about that axis or about the axis of incidence, so that an undesirable beam deflection (e.g., in the case of optical elements that are not planar but are spherically curved) can be avoided or reduced further. In particular, a translational movement of the reflective optic is prevented or at least reduced considerably by this arrangement of the longitudinal axes. The longitudinal axes of the holding arms to that end preferably extend in a common plane. The axis extending perpendicularly to the reflective optics typically passes through the point of impingement of the laser beam on the reflective optics during operation of the laser.

In some implementations, the holding faces are formed by ends, e.g., circular ends, of the holding arms. The circular ends of the holding arms can have, for example, a larger diameter in comparison with the mean cross-section of a slender holding arm, so that good transmission of force into the holding arms is possible.

In some implementations, the holding faces can be deflected parallel to a reflective surface of the reflective optic or tangentially with respect to the rear side of the optic.

As a result, the holding faces can advantageously be moved or displaced in a direction which generally coincides with the main expansion direction of the reflective optics. If the reflective optics expands in such a main expansion direction (e.g., typically in the plane of the mirror for a planar mirror), the expansion is compensated for by the resilient deflection capability (or deformability, pivotability or bendability) of the holding members and the accompanying movability of the holding faces formed on the holding arms. That is, the holding faces holding or supporting the reflective optic(s) are able to follow the expansion movement. If the reflective optic is, for example, a concave mirror or a spherically curved mirror, the holding faces are correspondingly tangentially deflectable with respect to the rear side of the reflective optic (i.e., likewise in the corresponding main expansion direction of the mirror thus shaped), so that, even in the case of such a reflective optic, yielding of the holding members without a change in the position or orientation of the point of impingement of the laser beam is possible.

In some implementations, the holding faces are arranged rotationally symmetrically with respect to an axis extending perpendicularly to the reflective optic. Such an axis extending perpendicularly to the reflective optic or to the reflective surface of the optic constitutes the axis of incidence of a laser beam deflected by reflection at the optics. The amount of heat introduced into the reflective optic by the laser radiation is accordingly dissipated more evenly in terms of time and space by the holding faces and the holding arms, such that a more even temperature gradient or a more even temperature field can be established in the reflective optic. This, in turn, leads to more even expansion and accordingly less distortion of the reflective optics, as well as a reduction of the deformation-related change in the spatial position and orientation of the reflective optic (in particular at the point of impingement of the laser beam). As a result of this arrangement of the holding faces, the heat dissipation is controlled so that a deformation (e.g., expansion) of the reflective optic is minimized or even prevented altogether. Furthermore, the holding arms and/or holding faces are preferably of the same size and/or made from the same material.

In some implementations, all the holding members of the optics holder are resiliently deflectable. The reflective optic is then advantageously mounted in a particularly flexible manner, so that even relatively small local temperature differences can be equalized without leading to distortion or a change in the position of the reflective optic.

In some implementations, one of the at least two holding members is a fixed (e.g., non-resilient) support body having a support face to which the reflective optic is fixed. The majority of the heat to be conveyed away can be advantageously dissipated by the fixed support body. Furthermore, the support body constitutes a particularly secure fixed bearing for the reflective optic, which allows relatively strong mechanical mounting and fixing of the reflective optic.

In some implementations, the support body is arranged centrally with respect to other resiliently deflectable holding members, e.g., at the optical center of the reflective optic. Accordingly, the majority of the heat is conveyed away at the point at which the heat input typically takes place, i.e., in the region where the laser beam to be reflected impinges. If the support body were arranged at a different point (for example, eccentrically), heat flow would occur in the reflective optic from the heat input site (i.e., the point of impingement of the laser beam or the optical center) to the support body (i.e., the "main heat sink"), which could lead to a disadvantageous unsymmetrical expansion and distortion of the reflective optic. This can be advantageously prevented by a central arrangement of the support body.

In some implementations, the reflective optic is fixed on its rear side to the holding faces and/or the support face. By fixing the reflective optic on its rear side, the side of the reflective optic upon which laser radiation is not incident is advantageously used for holding or handling. This permits a more even arrangement of the holding faces and/or the support face on the reflective optic. The rear side of the reflective optic is generally opposite the reflective side or the mirror surface.

In some implementations, the reflective optic is fixed to the holding faces and/or to the support face by an adhesive means. Adhesive means (typically adhesives) include, for example, ultraviolet (UV)-cured or two-component adhesives and are a simple and effective connecting or fixing method for the reflective optic. The reflective optic can be fixed securely and conveniently to the optics holder by the adhesive. The adhesive bond or adhesive layer can be made particularly thin, because the adhesive layer performs a connecting or fixing function, not compensation of stresses or different expansions at the point of connection. A thin adhesive layer has an advantageous effect on an undisturbed heat flow. Negative consequences that result from moisture absorption by the adhesive layer may also be reduced using the thin adhesive layer.

In some implementations, the optics holder has at least three resiliently deflectable holding members. With the relatively small number of three resilient holding members, the manufacturing costs of the optics holder can be advantageously reduced. In principle, however, use can be made of the advantages of the flexible and even mounting of the reflective optic as the number of resilient holding members (and, corresponding to the increasing number of resilient holding members, a reduced value of the number of resilient holding members) increases.

The optics holder can be formed, for example, of an aluminum alloy. Aluminum alloys exhibit particularly good spring properties for the resilient deflection capability or deformability of resilient holding members. In addition, aluminum allows are simple to process as well as being relatively inexpensive to obtain.

In some implementations, the outside contour of the reflective optic is circular. As a result, the shape of the reflective optic is advantageously adapted to the beam cross-section of the laser beam, which is generally likewise round, so that a more even temperature and stress distribution is established in the reflective optic.

In some implementations, the optics holder is in one piece. In particular, the resilient deflectable holding members are tongue-shaped and are formed in one piece on a base body of the optics holder. The dissipation of heat into the optics holder can be influenced by the form of the resilient holding members with an adapted geometry. This can be brought about, for example, by varying the width, the shape, the amount of material or the cross-section of the individual holding members.

Further advantages will become apparent from the description and the drawings. Likewise, the features mentioned hereinabove and those described hereinbelow can each be used on their own or in arbitrary combinations. The embodiments illustrated and described are not to be interpreted as being a conclusive list but instead are exemplary in nature for illustrating the invention.

BRIEF DESCRIPTION OF THE DRAWINGS

FIG. 1 is a perspective front view of an optical arrangement.

FIG. 2 is a perspective rear view of the optical arrangement of FIG. 1.

FIG. 3 is a rear view of the optical arrangement of FIG. 1.

FIG. 4 is a side view of the optical arrangement of FIG. 1.

FIG. 5 is a front view of an optics holder of FIG. 1 without a reflective optic.

DETAILED DESCRIPTION

Figure 6:
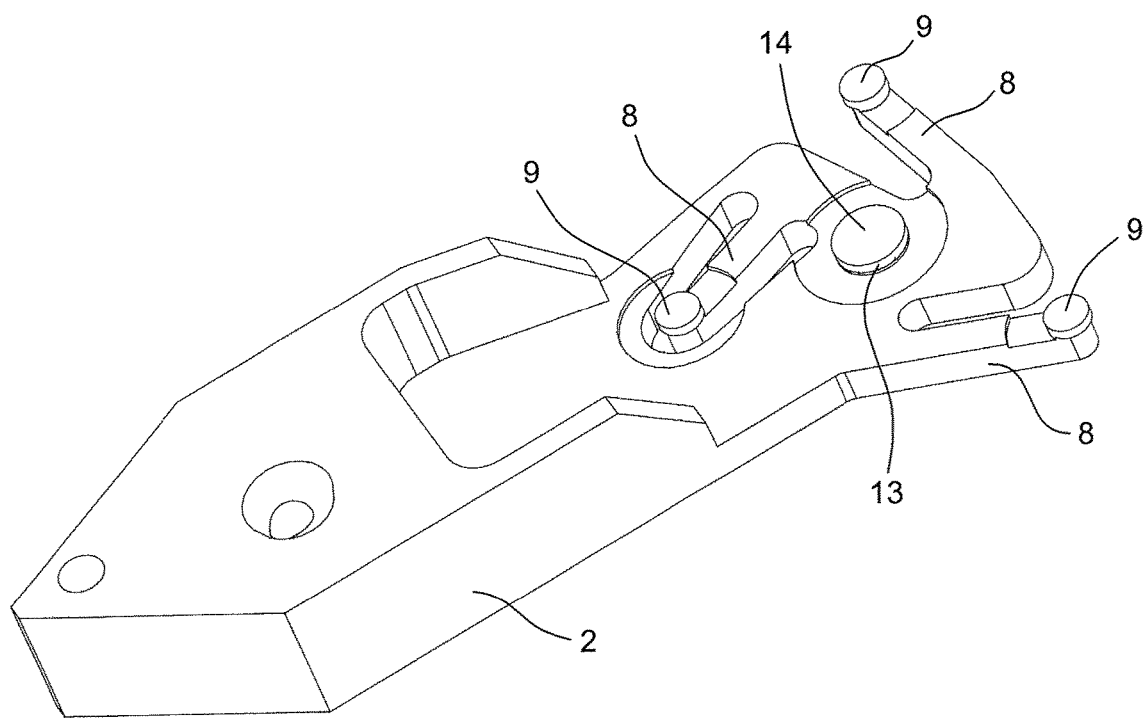
FIG. 6 is a perspective front view of an optical arrangement without a reflective optic.

FIG. 1 is a schematic illustrating an example of an optical arrangement 1 having an optics holder 2 and a reflective optic 3, which is fixed to the optics holder 2. An incident laser beam 4 is deflected by the reflective optic 3. The laser beam 4 strikes the point of impingement 6 of the reflective optic 3 at an angle of incidence a with respect to the axis of incidence 5 located perpendicularly on the reflective optic 3 and experiences a change of direction so that the beam 4 is subsequently reflected by the reflective optic 3 at an angle of reflection $\alpha$. In FIG. 1, the laser beam 4 is shown as a line, but it will be appreciated that the reflected laser beam 4 can have a broader beam cross-section, so that the point of impingement 6 is broadened (or corresponds to a region of impingement). The reflective optic 3 has a reflective surface 7. The reflective optic 3 can include, for example, a substrate and a reflective coating. Typically, the reflective optic 3, for example, a mirror, is composed of a glass material. The optical arrangement 1 can be used wherever the manipulation of a laser beam 4 or other electromagnetic radiation is desired, for example in laser processing machines.

Because a certain proportion of the radiant power of the incident laser beam 4 is absorbed by the reflective optics 3, and not all of the radiant power of the incident laser beam 4 generally is reflected, the laser beam 4 serves as a heat input, which can lead to heating and thus local and/or global deformation of the reflective optics 3.

FIG. 2 shows the fixing or holding of the reflective optic 3 on the optics holder 2 of the optical arrangement 1 by holding members formed as holding arms 8 on the optics holder 2. The optics holder 2 has three resiliently deflectable holding arms 8 on whose free ends circular holding faces 9 are formed. The holding arms 8 and the holding faces 9 formed on the holding arms 8 are movable based on the resilient deflection capability in directions 10 parallel to the reflective surface 7. Accordingly, the holding arms 8 and holding faces 9 advantageously follow local and/or global expansion movement of the reflective optic 3 without the point of impingement 6 or a region of impingement on the reflective surface 7 being influenced in terms of its spatial position or location, which might lead to unintentional deflection of the laser beam 4. The holding faces 9 or holding arms 8 are also at least slightly resiliently deflectable in a direction perpendicular to the reflective surface 7, so that expansion movements of the reflective optic 3 in that direction (for example, as a result of a temperature-related curvature of the reflective optic 3) can also be equalized (compensated for) by the holding arms 8 or holding faces 9. In an example where the reflective optic 3 is in the form of a parabolic or curved mirror (not shown), the holding faces 9 or holding arms 8 are capable of performing an equalization movement tangentially with respect to the curved rear side 11 of the reflective optic 3. The reflective optic 3 is typically fixed to the holding faces 9 by the reflective optic's rear side 11.

FIG. 3 shows the geometric arrangement of the holding faces 9 and the resiliently deflectable holding arms 8 on the rear side 11 of the reflective optic 3 of the optical arrangement 1. On the one hand, the holding faces 9 are arranged rotationally symmetrically with respect to the axis of incidence 5 of the laser beam 4, so that a dissipation of heat or removal of heat by the holding faces 9 and the holding arms 8 into the optical element holder 2 takes place symmetrically with respect to the point of impingement 6 or to the region of impingement of the laser beam 4 (that is to say symmetrically with respect to the heat source or with respect to the heat input site). Accordingly, a more even temperature field is established in the reflective optic 3, by which the temperature-related deformation or expansion of the reflective optics 3 advantageously occurs more evenly. On the other hand, the longitudinal axes 12 of the holding arms 8 are arranged equidistantly (at the same distance D) with respect to the point of impingement 6 of the laser beam 4 or with respect to the axis of incidence 5. As a result, a temperature-related change in the length of the holding arms 8 results in only a slight rotation of the reflective optic 3 about the axis of incidence 5, so that, in the case the reflective optic has a curved or spherical shape, the holding or fastening of the reflective optic 3 on or to the optics holder 2 does not lead to unintentional beam deflection.

FIG. 4 shows the optical arrangement 1 in a side view. The reflective optic 3 is fixed to the holding faces 9 by an adhesive applied to the holding faces 9. Because the adhesive layer between the holding faces 9 and the rear side 11 of the reflective optic 3 is provided simply for fixing, the adhesive layer can advantageously be applied particularly thinly. The resiliently deflectable holding arms 8 are formed in one piece on the optical element holder 2 as slender webs. The optics holder 2 can be fixed using corresponding fixing means to further machine parts (not shown) (for example, as a laser processing machine).

FIG. 5 shows the optics holder 2 with the holding faces 9 formed at the free circular ends of the holding arms 8. The optics holder 2 is made of an aluminum alloy, which permits the suitable resilient deflection capability of the holding arms 8. For fixing, the adhesive is applied to the holding faces 9 of the reflective optic 3 and then bonded to the reflective optic 3.

FIG. 6 shows an optics holder 2 that, similar to the optics holders in FIGS. 1 to 5, has three holding members in the form of resiliently deflectable holding arms 8 and circular holding faces 9 for fixing of the reflective optic 3, in which each holding face 9 is formed at a free end of a corresponding holding arm 8. Unlike the optics holder 2 of FIGS. 1 to 5, the optics holder 2 of FIG. 6 has an additional holding member that is arranged centrally with respect to the holding faces 9 and is in the form of a fixed support body 13. The support body 13 has a support face 14 for fixing of the reflective optic 3. The holding arms 8 and/or holding faces 9 are arranged rotationally symmetrically around the support body 13.

Figure 7:
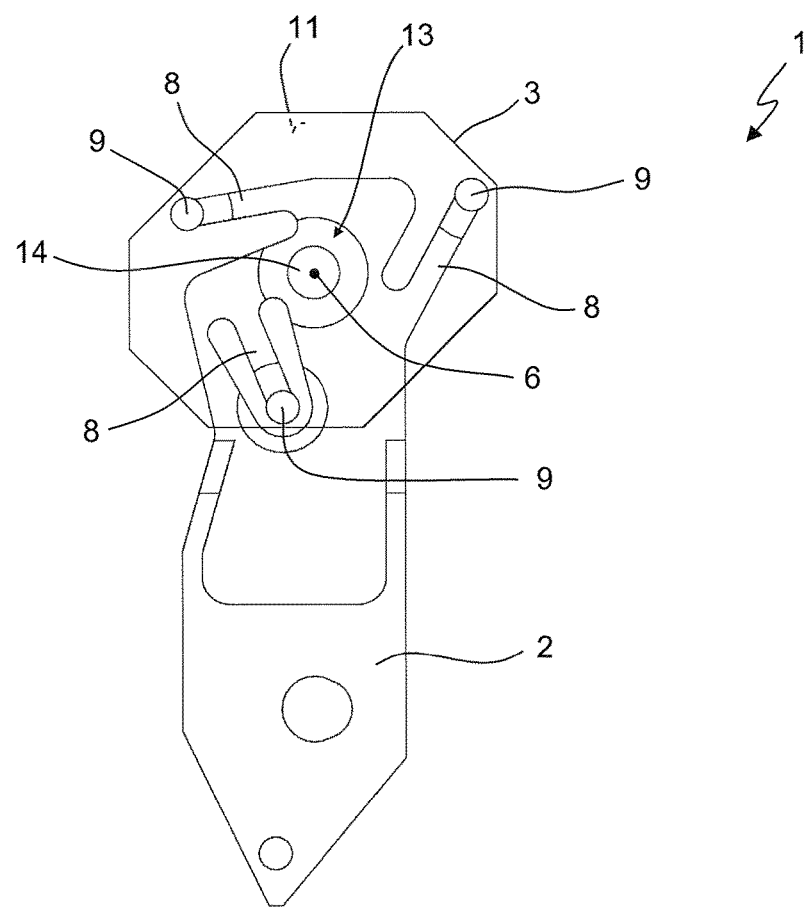
FIG. 7 is a front view of the optical arrangement of FIG. 6 with a reflective optic.

FIG. 7 shows the optics holder 2 of FIG. 6, in which the reflective optic 3 (shown in FIG. 7 in transparent form) is fixed to the optics holder 2 by three holding members in the form of holding arms 8 and the holding member in the form of the support body 13. Fixing takes place using an adhesive layer, which is applied to the holding faces 9 and the support face 14, on the one hand, and to the rear side 11 of the reflective optics 3, on the other hand. With the adhesive bond to the support surface 14, secure fixing of the reflective optic 3 to the optics holder 2 can be ensured. The holding faces 9 also contribute to a mechanical stabilization of the reflective optic 3 on the optics holder 2.

In the optical arrangement 1 of FIG. 7 formed by the reflective optic 3 and the optics holder 2, most of the heat introduced by the laser beam 4 is dissipated into the optics holder 2 through the centrally arranged support body 13 before the heat is able to spread into regions of the reflective optic 3 that lie radially outside the region of the point of incidence 6 of the laser beam 4. This further allows the holding faces 9 of the holding arms 8 (and accordingly the adhesive layers) of FIG. 7 to be made smaller than the holding faces 9 of FIGS. 1 to 5. Because most of the heat that is introduced is already dissipated into the optics holder 2 at the input site, the heat-related expansions of the reflective optic 3 are generally reduced, so that the heat-related stresses that occur in the reflective optic 3 are also lower. Should such expansions nevertheless occur (although to a reduced extent) in the reflective optic 3, the resiliently deflectable holding arms 8 are advantageously able to follow or compensate for those expansion movements and continue to perform their stabilizing function.

A number of embodiments have been described. Nevertheless, it will be understood that various modifications may be made without departing from the spirit and scope of the invention. Accordingly, other embodiments are within the scope of the following claims.

What is claimed is:

1. An optical arrangement comprising:
an optics holder; and
a reflective optic fixed to the optics holder, the optics holder comprising at least three holding arms with resiliently deflectable free ends, at least two of the holding arms comprising holding faces at their free ends for fixing the reflective optic to the optics holder, wherein each holding arm comprises a corresponding longitudinal axis extending along an elongated portion of the holding arm, and the plurality of longitudinal axes are arranged equidistantly with respect to an axis extending perpendicularly to a reflective surface of the reflective optic, and
the optics holder is formed as one piece.

2. The optical arrangement according to claim 1, wherein each holding face comprises a circular end of the holding arm on which the holding face is arranged.

3. The optical arrangement according to claim 1, wherein each holding face is deflectable along a direction that is parallel to a reflective surface of the reflective optic or is deflectable tangentially with respect to a rear side of the optic.

4. The optical arrangement according to claim 1, wherein the holding faces are arranged rotationally symmetrically with respect to an axis extending perpendicularly to a reflective surface of the reflective optics.

5. The optical arrangement according to claim 1, wherein all the holding arms of the optics holder are resiliently deflectable.

6. The optical arrangement according to claim 1, wherein one of the at least three holding arms comprises a fixed, non-resilient support body having a support face to which the reflective optic is fixed.

7. The optical arrangement according to claim 6, wherein the resiliently deflectable holding arms are arranged symmetrically around a center region, and the support body is arranged at the center region.

8. The optical arrangement according to claim 1, wherein a rear surface of the reflective optic is fixed to the holding faces, wherein the rear surface is opposite from a reflective surface of the reflective optic.

9. The optical arrangement according claim 1, wherein the reflective optic is fixed by an adhesive to the holding faces.

10. The optical arrangement according to claim 1, wherein the optics holder is formed of an aluminum alloy.

* * * * *